US006695698B1

(12) United States Patent
Anghelo et al.

(10) Patent No.: US 6,695,698 B1
(45) Date of Patent: Feb. 24, 2004

(54) ELECTRO-MECHANICAL COIN OPERATED CAPSULE DISPENSING GAME SYSTEM

(75) Inventors: Python Anghelo, Arlington Heights, IL (US); Bryan Hansen, Fox River Grove, IL (US); William Pfutzenreuter, Hoffman Estates, IL (US)

(73) Assignee: Pixy Games, Inc., Oceanside, CA (US)

( * ) Notice: Subject to any disclaimer, the term of this patent is extended or adjusted under 35 U.S.C. 154(b) by 545 days.

(21) Appl. No.: 09/626,238

(22) Filed: Jul. 26, 2000

(51) Int. Cl.[7] .......................... A63F 13/00; G06F 17/00

(52) U.S. Cl. .............................. 463/25; 463/1; 463/16; 463/3; 463/7; 273/362; 273/364; 273/317; 273/366; 273/368; 273/138.1; 273/139; 273/143 R; 273/138.2; 273/440; 273/441; 273/445; 273/454; 273/447; 273/448; 221/217; 221/218; 221/220; 221/221; 221/222; 221/223; 221/163; 221/166

(58) Field of Search ............................. 463/1, 16, 3, 7; 273/362, 364, 317, 366, 368, 138.1, 139, 143 R, 138.2, 440, 441, 445, 454, 447, 448; 221/217, 218, 220, 221, 222, 223, 163, 166

(56) References Cited

U.S. PATENT DOCUMENTS

| | | | | |
|---|---|---|---|---|
| 896,234 A | * 8/1908 | Nicholes et al. | ............ | 221/121 |
| 2,363,340 A | * 11/1944 | Lau et al. | .................. | 221/121 |
| 4,176,762 A | * 12/1979 | Scalera et al. | .............. | 221/121 |
| 4,526,134 A | * 7/1985 | Sapp | .......................... | 222/166 |
| 4,807,886 A | * 2/1989 | Van Elderen et al. | ....... | 273/356 |
| 4,976,440 A | * 12/1990 | Faith | .......................... | 273/362 |
| 5,558,340 A | * 9/1996 | Ibe et al. | .................... | 273/148 |
| 5,848,935 A | * 12/1998 | Noell et al. | ................... | 463/16 |
| 6,241,119 B1 | * 6/2001 | Stephenson | ................. | 221/120 |
| 6,315,157 B1 | * 11/2001 | Halliburton | ................. | 221/123 |

FOREIGN PATENT DOCUMENTS

JP 410137438 * 5/1998 ............. A63F/9/02

OTHER PUBLICATIONS

*Drill–O–Matic* Brochure, 2071 North Dixie Highway, Pompano Beach, FL 33060.

*Key Catcher: The Catch of A Lifetime* Brochure, Sammy USA Corporation, 901 Cambridge Drive, Elk Grove Village, IL 60007.

*Time Buster: Direct Vend Prize Game* Brochure, Leisure and Allied Industries, 49 Kew Street, Welshpool, Western Australia 6106.

*Sports Arena Game, Prize and Redemption Catalog 1999–2000*, Sammy USA Corporation, 901 Cambridge Drive, Elk Grove Village, IL 60007.

* cited by examiner

*Primary Examiner*—J Harrison
(74) *Attorney, Agent, or Firm*—Wood, Phillips, Katz, Clark & Mortimer

(57) ABSTRACT

A dispensing game system includes a prize capsule storage hopper above two automatic hopper loaders that replenish the game below with prize capsules as needed. Two Ferris wheels carry free swinging gondolas that receive and hold the prize capsules from the loaders. Two or more player-activated actuator arms located next to the outer edge of the Ferris wheels are used to hit targets attached to the moving gondolas, in turn causing the gondolas to tip forward and release the prize capsule, which then falls down and rolls into the prize opening for the player to collect.

26 Claims, 8 Drawing Sheets

ELECTRO-MECHANICAL COIN OPERATED CAPSULE DISPENSING GAME SYSTEM

BACKGROUND OF THE INVENTION

This invention relates, generally, to electro-mechanical games that challenge players to use their motor skills, sense of timing and sense of space in order to win and be rewarded if they play well, and a prize at the end of the game.

One such game of this type comprises a so-called crane game, where prizes are won by the player manipulating a crane claw over plush animals or other prizes and trying to position and release the crane claw in order to win one of those prizes. Another type of such game, which may also be classified as a merchandiser, enables prizes to be won by the player by manipulating a drill type spinning cylinder by positioning it and releasing it forward toward a wall full of holes that holds prizes. If the cylinder penetrates perfectly through the center of a hole in the wall a prize will be pushed through to fall out and enable the player to collect it from a receiving bin.

SUMMARY OF THE INVENTION

The invention consists of a container of capsules containing prizes that are fed as needed from above into gondolas of a Ferris wheel. The Ferris wheel rotates toward or away from the player with the wheel perpendicular to the player's field of vision, thus parading by him the prizes held by the gondolas. Next to the circumference of each Ferris wheel there is a mechanism that, when activated by the player, can either swing, push or obstruct a target attached to one of the gondolas, thus causing the gondola to tip around its axis and to unload the capsule. Gravity will carry the prize capsule down and forward for the player to collect.

The game play can be configured as a skill only game. Alternatively, the game play can be automatically percentaged like a mechanized or redemption game. The game play can also be mathematically and electronically set to be a game of chance, similar to a slot machine or an other gaming device.

DETAILED DESCRIPTION OF THE PREFERRED EMBODIMENT

Figure 1:
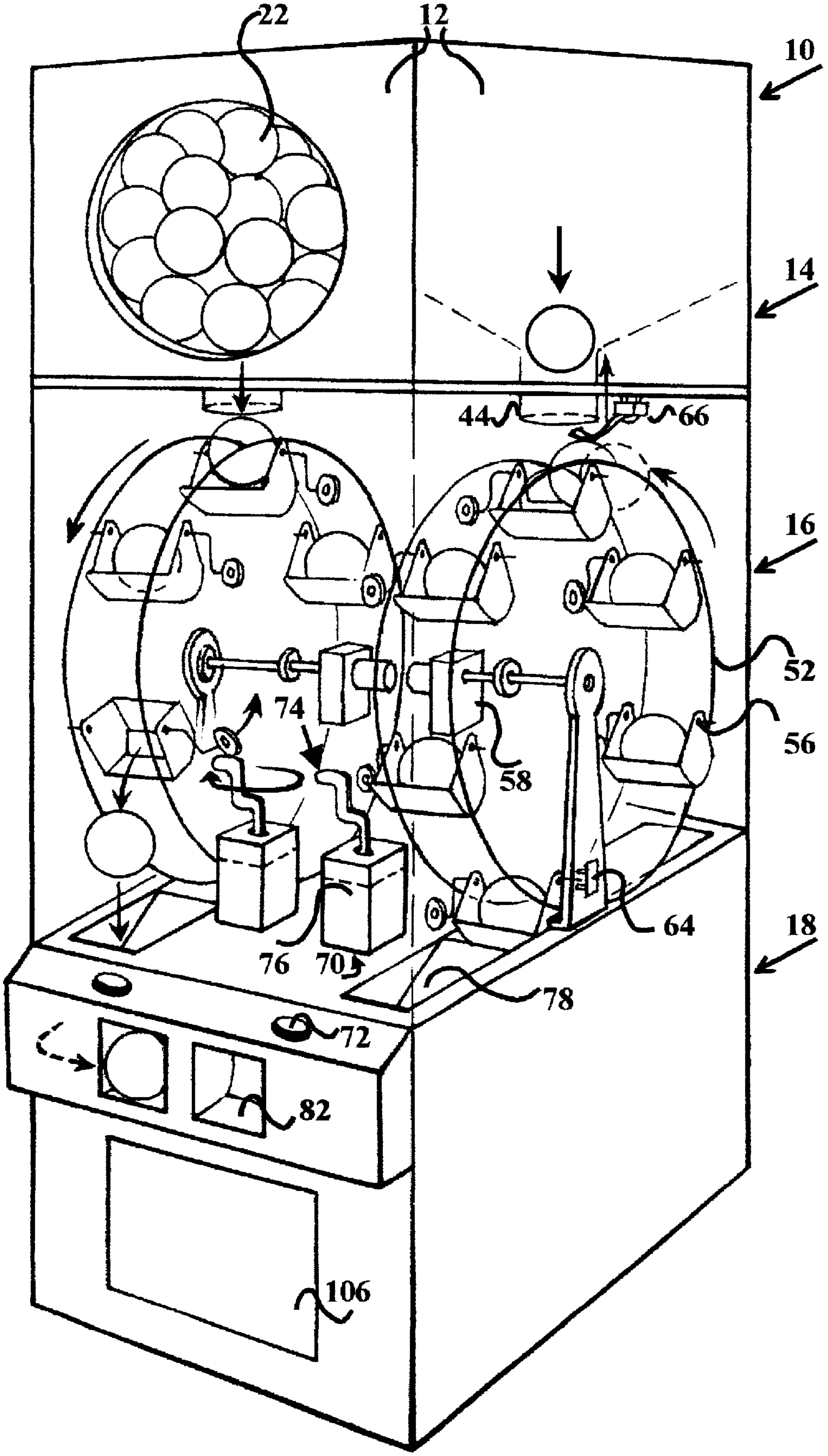
FIG. 1 is a perspective view of a dispensing game system in accordance with the invention.
Figure 2:
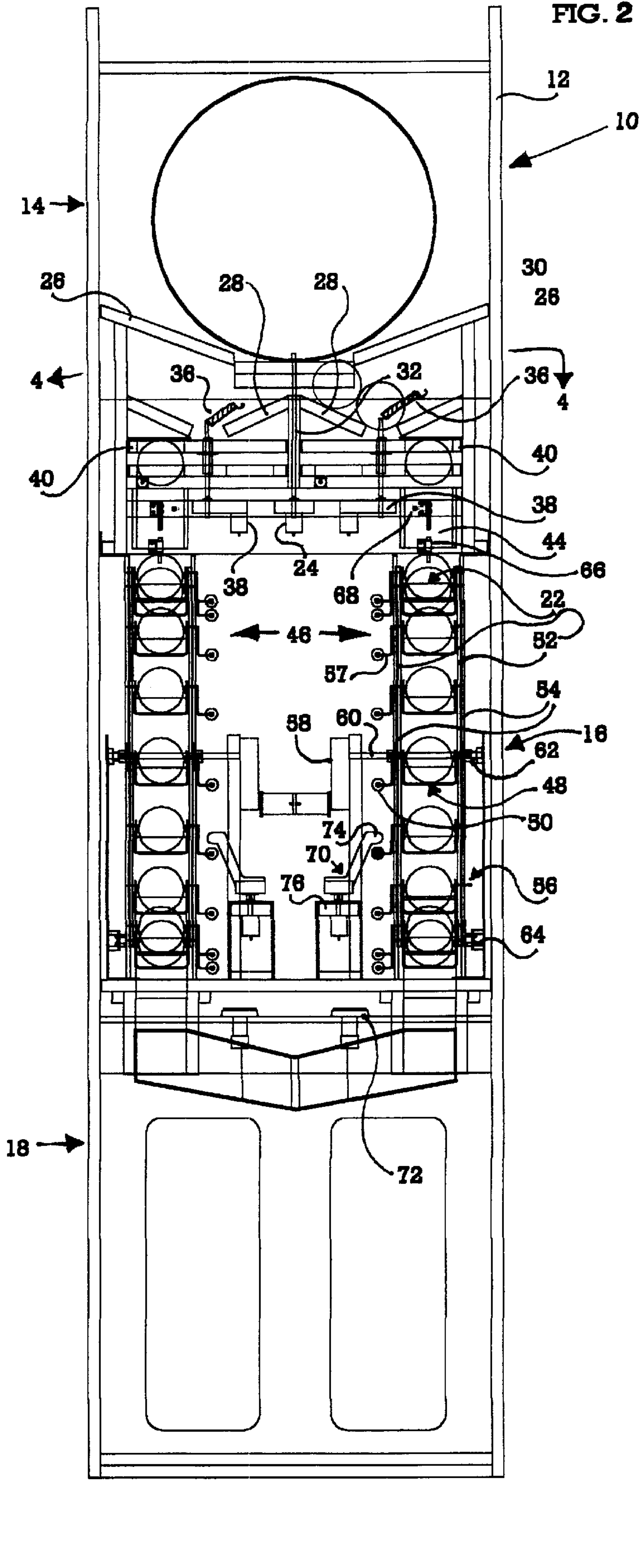
FIG. 2 is a front elevation view of the dispensing game system of FIG. 1, with parts removed for clarity.
Figure 3:
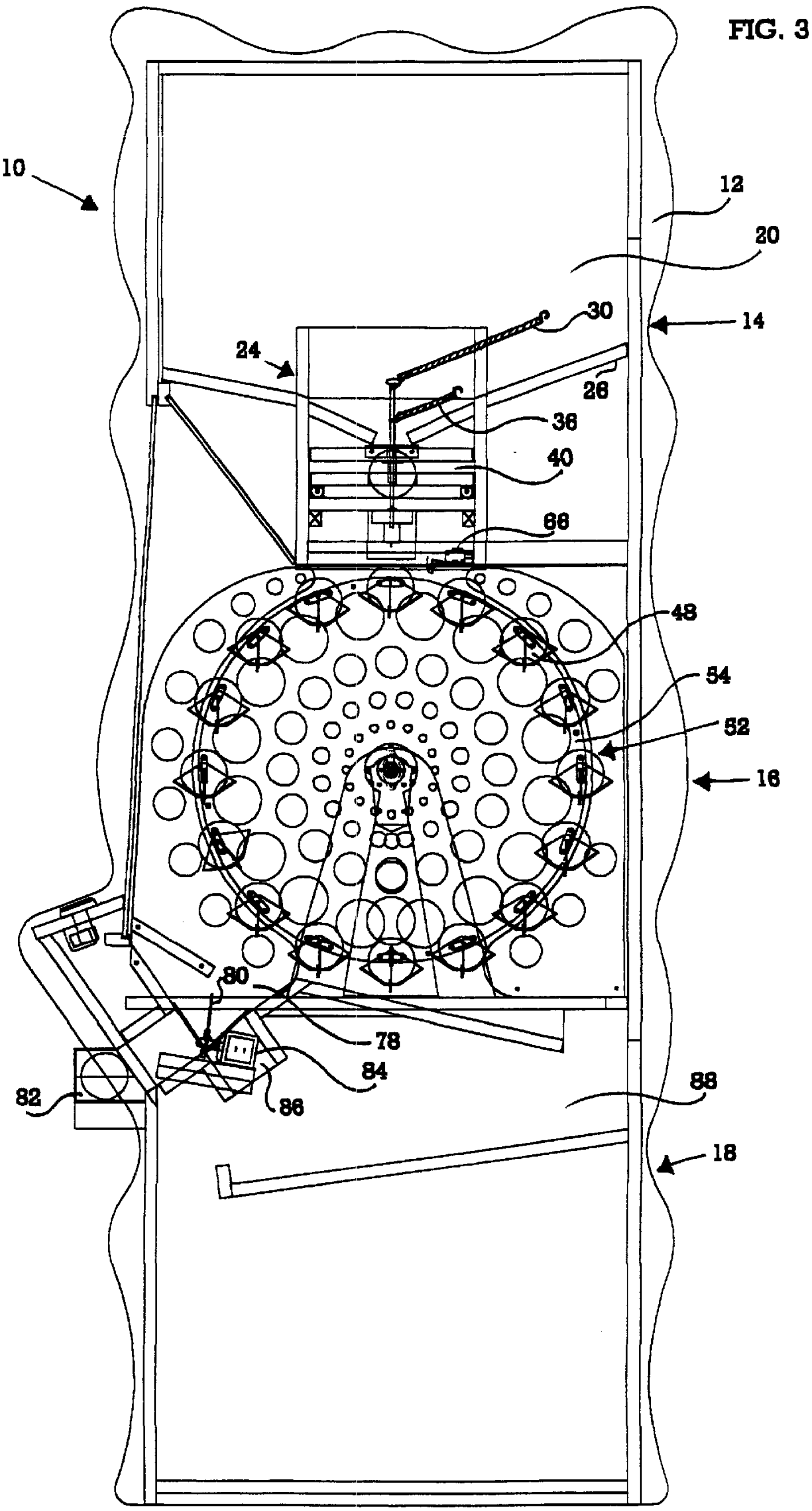
FIG. 3 is a side elevation view of the dispensing game system of FIG. 1, with parts removed for clarity.

Referring to the drawings, and particularly FIGS. 1–3, a dispensing game system 10 in accordance with the invention is illustrated. The game system 10 comprises an electro-mechanical coin operated game and is housed in a modified video game cabinet 12. The cabinet 12 is approximately 27 inches wide, 78 inches tall and 38 inches deep. The cabinet 12 is effectively divided into a top holding space 14, a middle game space 16 and a bottom dispensing space 18.

The holding space 14 includes a hopper 20 that can store up to 600 3-inch diameter plastic spherical capsules 22 that contain prizes. The capsules 22 comprise articles to be dispensed during playing of the game system 10. While the game is illustrated in connection with plastic spherical capsules, other types of articles to be dispensed could be used, as will be apparent to those skilled in the art. The prizes contained in the capsules 22 could consist, for example, of toys or the like or tickets having predefined values for redemption for prizes.

Figure 4:
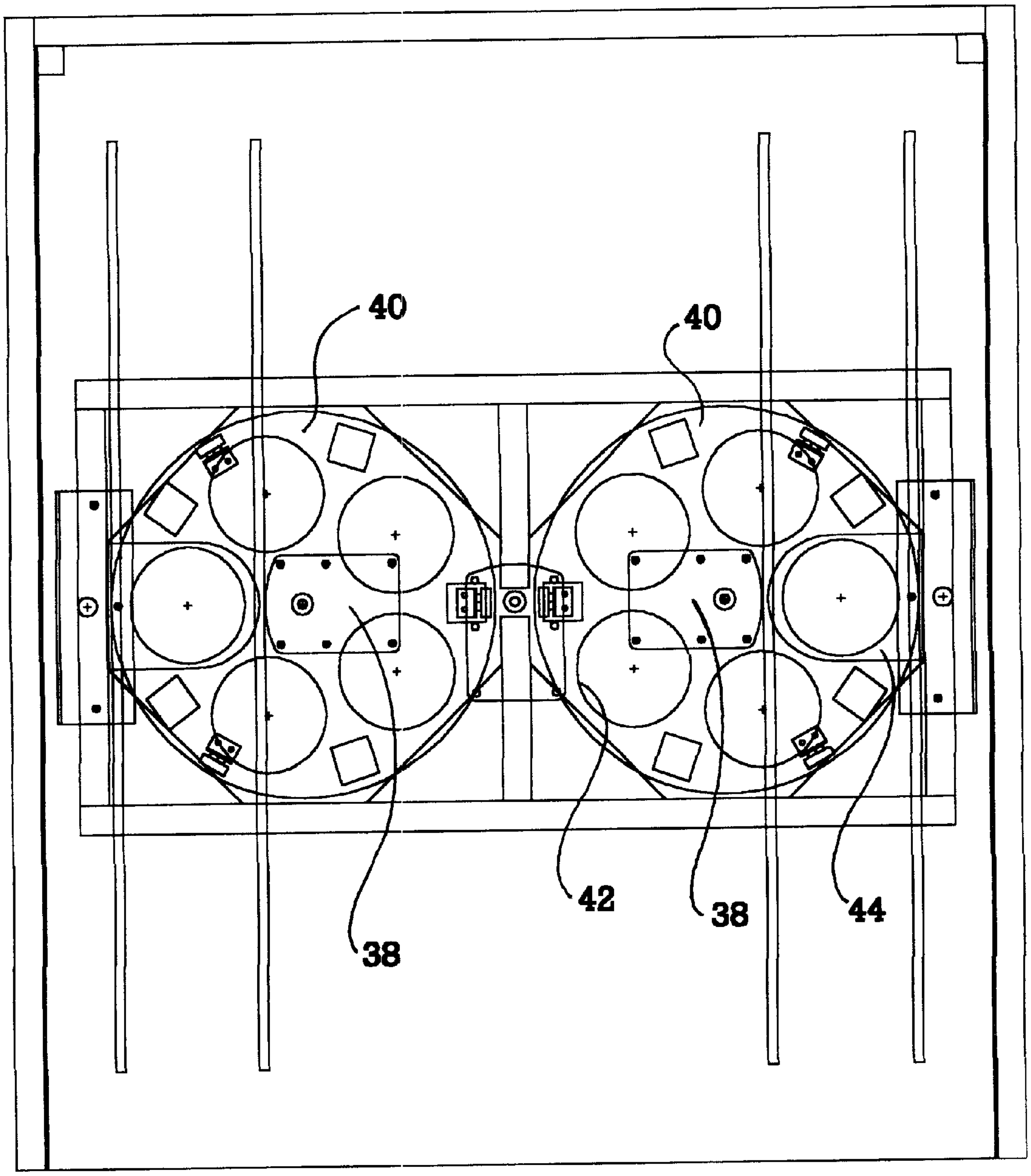
FIG. 4 is a sectional view taken along the line 4—4 of FIG. 2.

A feed system 24 is adapted to feed the capsules 22 from the hopper 20 to the game space 16. The hopper 20 is defined by angled bottom walls 26 for delivering the capsules 22 to an inlet of the feed system 24. The feed system 24 includes a large agitator spring 30 activated by a rod 32 and motor 34, see FIG. 2, to spin and dislodge any binding capsules 22. This ensures a continuous flow downward. Lower angled walls 28 deliver the capsules 22 to opposite feeder wheels 40. Each feeder wheel 40 is driven by a motor 38. Each motor 38 also drives a smaller agitator spring 36 to spin and feed the capsules 22 to the feeder wheels 40. Particularly, and referring to FIG. 4, each feeder wheel 40 includes five peripheral openings 42. Each opening 42 is sized to receive a capsule 22. The feeder wheel 40 is selectively driven by the motor 38 to drop capsules into a feeding tube 44. The feeding tube 44 delivers the capsules to the game space 16.

In the illustrated embodiment of the invention, the dispensing game system is adapted to be played by two players. Particularly, the game space 16 holds a pair of game devices 46 each of which is essentially identical in construction. Therefore, only one will be discussed specifically herein. As will be apparent, the dispensing game system 10 could include a single game device 46 or greater than two devices 46, as necessary or desired.

In the illustrated embodiment of the invention, one of the game devices 46 is mounted on a left side of the cabinet 12, while the other of the game devices 46 is mounted on the right side of the cabinets 12, both looking from the front.

The game device 46 includes a plurality of carriers in the form of gondolas 48 each for carrying a capsule 22. The gondolas 48 are carried on a support 52. The support 52 comprises a pair of opposite wheels 54, generally in the form of a Ferris wheel. Each of the gondolas 58 is carried by the Ferris wheel about a freely pivoting axis defined by an outer pin 56 and an inner pin 57. Each gondola 48 carries an inwardly extending target 50 affixed to the inner pin 57. In the embodiment of the invention illustrated in FIGS. 2 and 3, the Ferris wheel 52 has sixteen gondolas 48, while in FIG. 1 only six gondolas 48 are included. The number of gondolas may vary in direct proportion to the size of the capsules 22 and thus the size of the gondolas 48. For example, when capsules are less than 3 inches in diameter, then the gondolas 48 can be smaller, therefore their number on a same diameter Ferris wheel 52 can be greater. When capsules 22 are more than 3 inches in diameter, then the gondolas 48 holding them will be larger. Therefore, the number of gondolas 48 on the same diameter Ferris wheel 52 will decrease.

The Ferris wheel 52 is driven by a motor 58 driving a shaft 60. The shaft 60 is hubbed in ball bearing 62. The shaft 60 defines an axis of rotation of the Ferris wheel 52 and is in a horizontal plane. As a result, the Ferris wheel 52 turns toward or away from a player, thus displaying in front of the player all of the prizes it holds. The player may then evaluate and pick from these prizes during playing of the game, as described below. The Ferris wheel 52 is controlled by software, as described below, that knows from the gondola pins 56 passing through a switch 64 where each gondola is located. The software also knows from a top-mounted switch 66 if a gondola 48 is empty or loaded. The software can thus stop the Ferris wheel 52 with an empty gondola 48 directly under the feeding tube 44 and operating the associated feeder wheel 40 to drop one capsule 22 into the empty gondola 48. The dropping of the capsule 22 is sensed by a switch 68 in the tube 44.

In the game, the Ferris wheel 52 is turning with the gondolas 48 full of capsules 22. Each gondola 48 has the lateral target 50 attached to the gondola's inner pin 57. When a player decides on a preferred prize held by a specific gondola 48, then the player will aim a swinging, pushing or obstructing mechanism 70 at that specific gondola's target 50 and push a player control button 72, thus firing the mechanism 70 towards the target 50. In the illustrated embodiment of the invention, the obstructing mechanism 70 comprises an actuator or arm 74 driven by a motor 76. The motor 76 rotates the actuator 74 about a vertical axis. The object of the game is to press the control button 72 so that the actuator 74 strikes a desired target 50.

Particularly, due to rotation of the Ferris wheel 52 about the axis of the shaft 60, the targets 50 move in a generally circular path in a vertical plane. The actuator 74, owing to its rotation about a vertical axis, rotates in a generally horizontal plane. The particular shape of the actuator 74 and its location relative to the Ferris wheel 52 is selected so that the path of the actuator 74 intersects the path of the targets 50 in an intersecting zone. This zone is defined as an area where the two paths intersect.

If timed and aimed correctly by the player, the obstructing mechanism 70 causes the target 50 to swing axially if struck thereby tipping the associated gondola 48 back and upwardly, thus unloading the capsule 22. The dumped capsule 22 free falls by gravity into an opening 78 and rolling past a cheat door 80 into a forward tunnel and continues further down into a prize opening 82 for the player to collect. The cheat door 80, shown in an open position in FIG. 3, is activated by a solenoid 84 anytime the player shakes or tilts the game in an attempt to dislodge capsules 22 from the gondolas 48 and cause them to fall into the prize door 82. At such time, the cheat door 80 swings open and diverts all undeserved capsules 22 through a lower shoot 86 back into a storage area 88 in the dispensing space 18.

Figure 5:
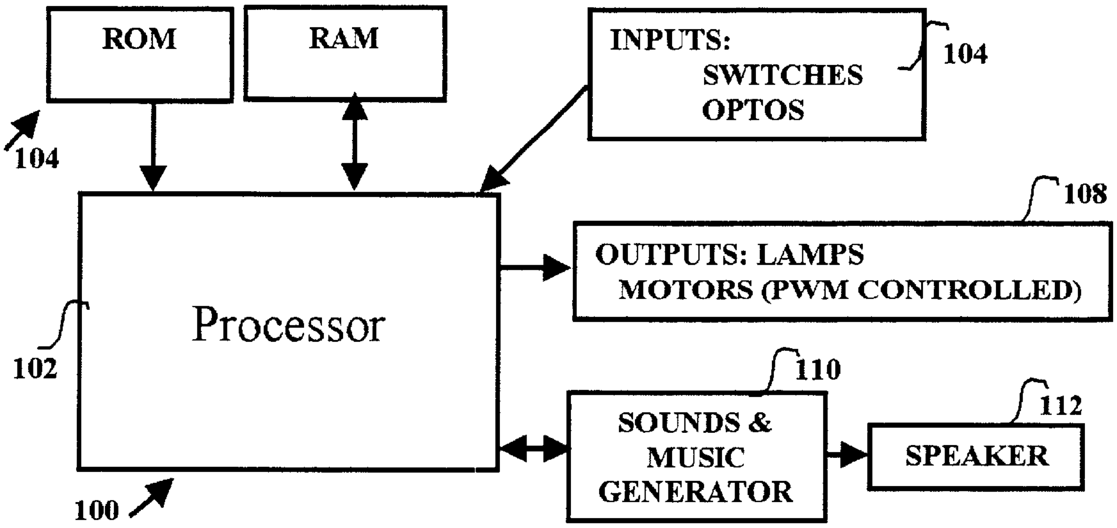
FIG. 5 is a block diagram of a control system for the dispensing game system of FIG. 1.

Referring to FIG. 5, a block diagram illustrates a control system 100 for the game system 10. The control system 100 includes a processor 102 operated in accordance with programs and data stored in memory 104. The processor 102 is connected to various input devices, referenced generally at 104, including, for example, the position switches 64, 66 and 68 and the user control button 72. The inputs could also include a coin box 106 in a coin operated version of the dispensing game system. The processor 102 is also connected to output devices, referenced generally at 108. The output devices include the motors 34, 38, 58 and 76. The outputs 108 also include various lamps (not shown) used during game play as well as the cheat door solenoid 84. The motors are controlled using pulse width modulation, as is known. Finally, the processor 102 is connected via a sound and music generator circuit 110 to a speaker 112 for sound and music during game play.

Figure 6:
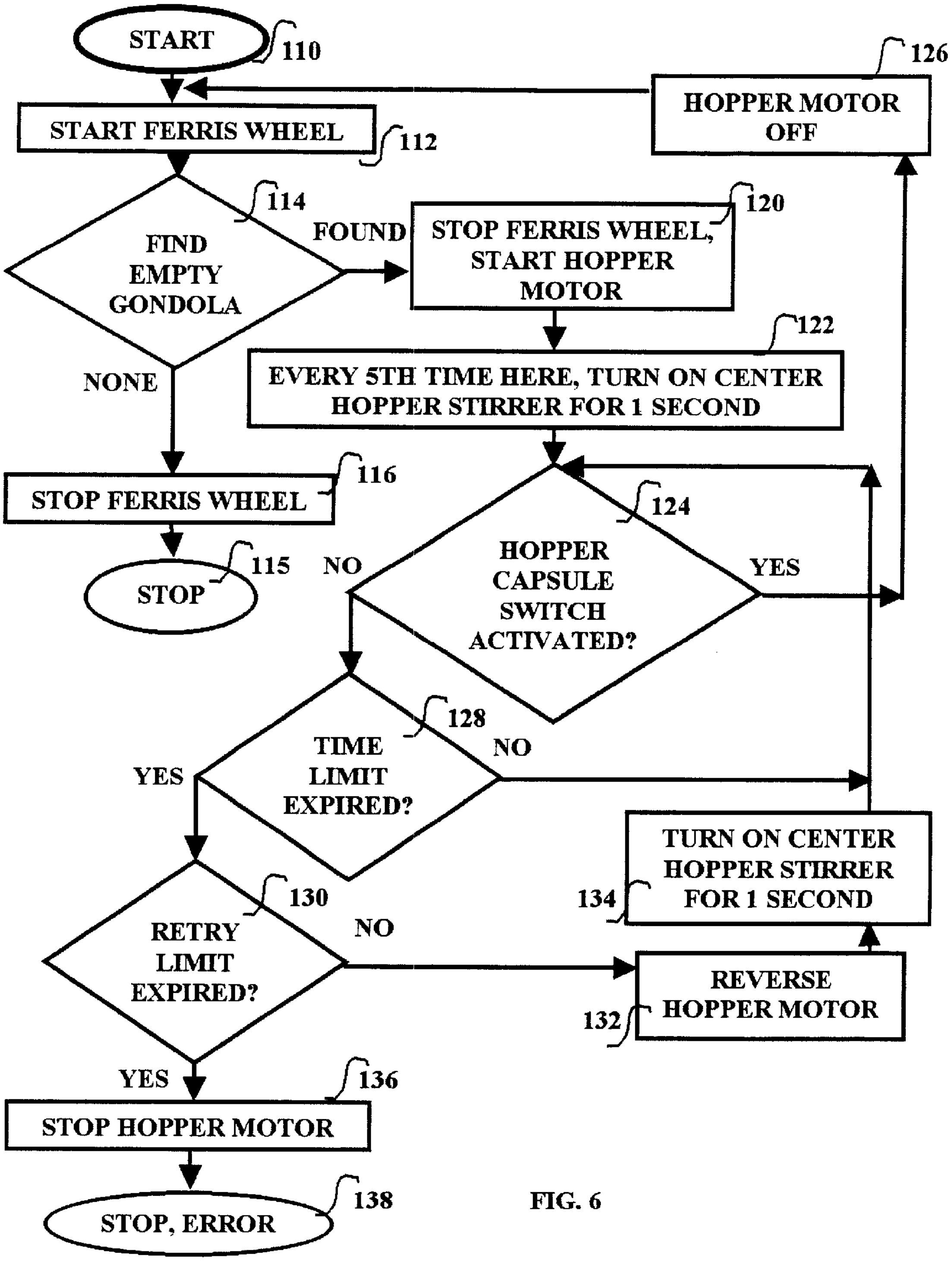
FIG. 6 is a flow diagram illustrating a routine for loading gondolas for the game dispensing system of FIG. 1.

Referring to FIG. 6, a flow diagram illustrates a program implemented by the processor 102 for loading capsules 22 from the hopper 20 into the gondolas 48. This routine begins at a start node 120. The Ferris wheel 52 is started at a block 112 by energizing the motor 58. A decision block 114 tries to find empty gondolas 48. This is done using the switch 66. If none are found, then the Ferris wheel 52 is stopped at a block 116 and the routine ends at a stop node 118. If an empty gondola 48 is found, as determined at the decision block 114, then the To Ferris wheel 52 is stopped at a block 120. Thereafter, the feeder motor 38 is turned on. At a block 122 the center hopper stirrer motor 34 is turned on every fifth time the program passes this point. A decision block 124 determines if the hopper capsule switch 68 is activated, indicating that a capsule 22 passed through the tube 44. If so, then the hopper motor 38 is turned off at a block 126 and the program returns to the block 112. If not, then a decision block 128 determines if a preselect time limit has expired. If not, then control returns to the decision block 124. If so, then a decision block 130 determines if a preselect retry limit has expired. If not, then the hopper motor 38 is reversed at a block 132. The center hopper stirrer motor 34 is turned on at a block 134 and the program then returns to the decision block 124. If, however, the retry limit has expired, as determined at the decision block 130, then the hopper motor 38 is stopped at a block 136 and the routine is stopped and an error indicated at stop node 138.

Thus, the program represented by the routine of FIG. 6 can be used to periodically load capsules 22 in all of the gondolas 48.

Figure 7:
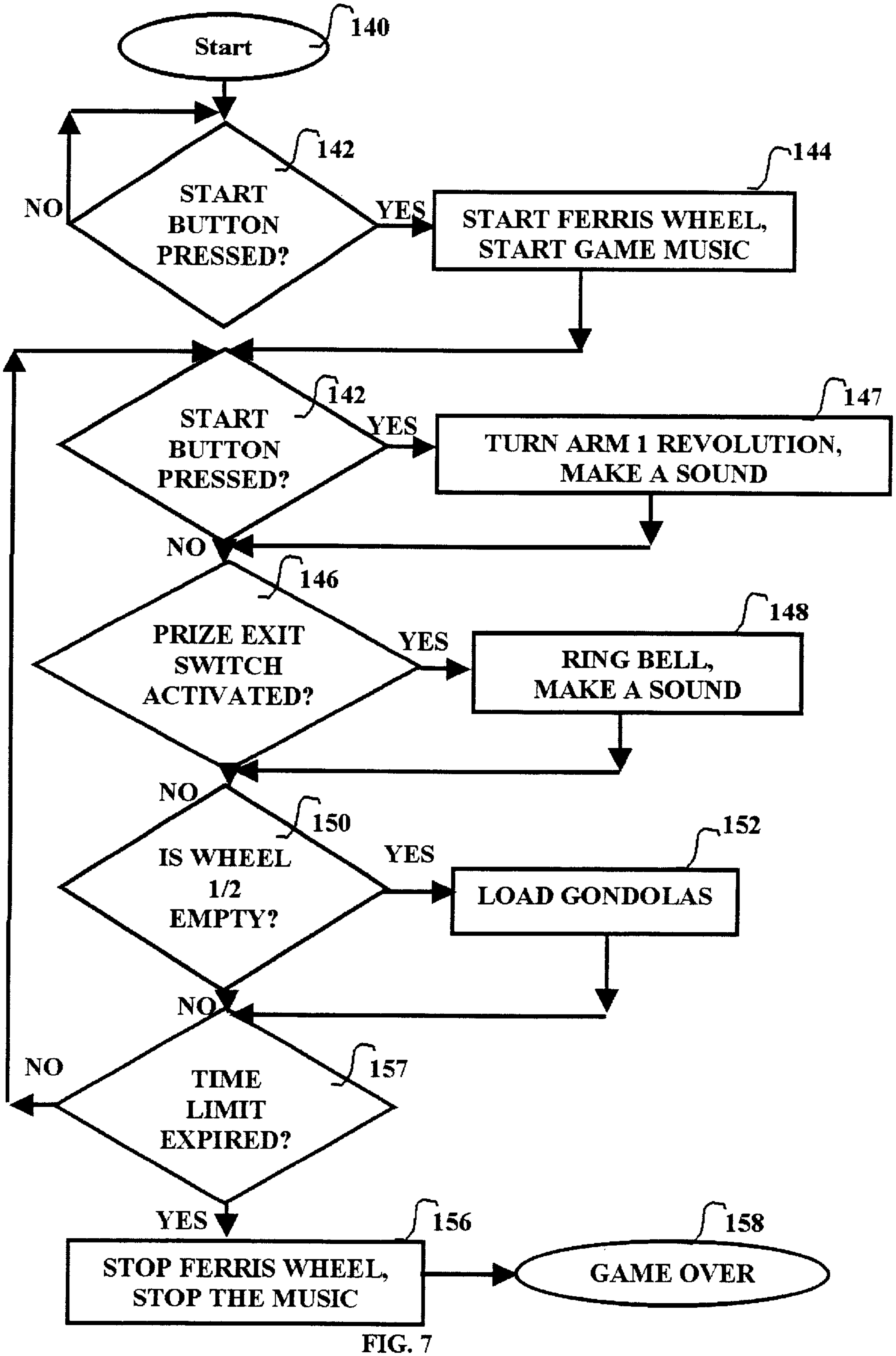
FIG. 7 is a flow diagram illustrating a program for playing the dispensing game system of FIG. 1.

Referring to FIG. 7, a flow diagram illustrates operation of the dispensing game system during game play. The program begins at a start node 140. A decision block 142 determines if a start button has been pressed. In the illustrated embodiment of the invention, the user button 72 comprises the start button. Typically, in a coin operated version of the dispensing game system, the start button 72 is recognized only after a required number and denomination of coins has been inserted, as is apparent.

After the start button is depressed, the Ferris wheel 52 and game music are started at a block 144. A decision block 146 determines if the start button 72 has been pressed. Particularly, the user will watch the position of the targets 50 relative to the operating mechanism 70. When the user anticipates that a selected one of the targets 50 is or is about to enter the intersecting zone, discussed above, the button 72 is depressed. If the button is depressed, then the operating mechanism 70 is turned one revolution at a block 144 and a sound is generated. Thereafter, or if the start button has not been pressed, as determined at the block 142, then a decision block 146 determines if a prize exit switch has been activated. The prize exit switch (not shown) determines if a prize has been dispensed to the dispensing opening 82. If so, then a bell is rung at a block 148. Thereafter, or if the prize exit switch was not activated, then a decision block 150 determines if the Ferris wheel 52 is half empty using the switch 66. If so, then the gondolas are loaded at a block 152 using the routine of FIG. 6. Thereafter, or if the Ferris wheel 52 is not half empty, then a decision block 154 determines if a time limit has expired. If not, then the routine returns to the block 142 to wait for the start button 72 to be pressed. If the time limit has expired, then the Ferris wheel 52 and the music are stopped at a block 156 and the routine ends at a game over node 158.

The dispensing game system 10 can be configured to provide for various skill levels of game operation. This can be done, for example, by selecting the size of the target 50.

As is apparent, the smaller the target, the more difficult the game. In fact, the various targets 50 could be of differing size to make some targets more difficult to hit than others. This could be done in conjunction with loading more valuable prizes in gondolas having smaller targets. Also, the position of the operating mechanism 70 relative to the Ferris wheel 52 can be selected to control the size of the intersecting zone. The smaller the size of the intersecting zone, the more difficult the game. Further, the speed of the Ferris wheel 52 can be controlled according to skill level. For example, by operating the motor 58 at a faster speed, the game play is more difficult to provide for higher skill level. In the illustrated embodiment of the invention, the speed of the Ferris wheel 52 is set by switches forming part of the input block 104 of FIG. 5. These could consist of user-accessible switches or operator-only accessible switches. Finally, the game play can be made more difficult by adjusting the number of revolutions of the operating mechanism.

The time limit set at the block 154 is used to limit the length of time of game play. This time limit may be set, for example, to provide for a single revolution of the Ferris wheel 52 for a single play of the game. In this aspect of the invention, the game consists of a single orbit of the Ferris wheel 52 and a single orbit of the operating mechanism 70. During actual play of the game, the player's skill level determines whether or not a prize is to be awarded. The player takes aim at the targets 50 considering time and space so that the player is not cheated out of a prize based on variations in game operation during actual play of the game.

The dispensing system described herein is in the configuration of a game. Additionally, the dispensing system could be used for other applications. One such application is bulk vending where a user selects an article in a specific one of the gondolas 48. A value might be assigned to each gondola. Assuming the user puts in sufficient money and selects the gondola, then the Ferris wheel 52 would stop with the target for the selected gondola in the intersecting zone and the operating mechanism 70 automatically turns to dispense the item.

Another application of the dispensing system is for a gaming system. In such a gaming system, the operating mechanism is randomly actuated by the processor 102. This is done based on a mathematical formula with the chance of the actuator 74 striking a target 50 being controlled in software.

Still another application is in a redemption device. Each capsule 22 would include tickets or coupons having a select value. The size of the target 50 could vary inversely proportional to the value of the ticket or coupon. The ticket or coupon could then be redeemed for prizes or awards or the like.

Figure 8:
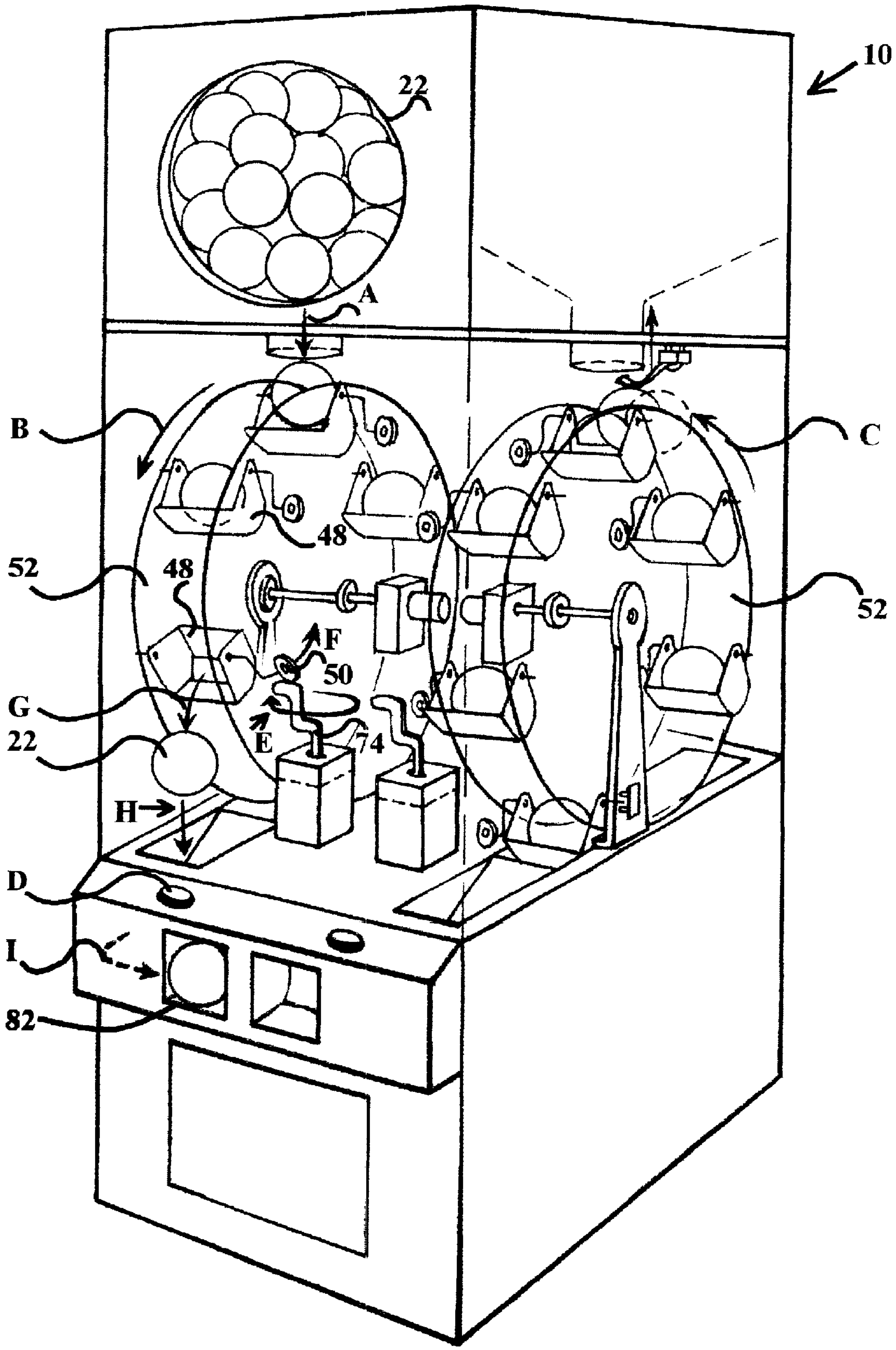
FIG. 8 is a perspective view, similar to that of FIG. 1, illustrating sequence of operation of the dispensing game system of FIG. 1.

Referring to FIG. 8, the dispensing game system 10 is illustrated with lettered arrows illustrating sequence of flow. The flow begins with an arrow "A" representing loading of capsules 22 into gondolas 48 on the rotating Ferris wheel 52, represented by the arrow "B" or "C". The rotation of the Ferris wheel 52 as shown with arrows "B" and "C" is also used during game play. During game play, the user actuates the switch at "D" causing rotation of the actuator 74 at "E". If the actuator 74 strikes the target 50, as at "F", then the gondola 48 is tipped as at "G" dropping the capsule 22, as at "H" to travel as at "I" to the prize opening 82.

While the invention has been described in detail with reference to the dependent figures, it will be apparent to those skilled in the art that numerous changes, details and construction of the device can be made without departing from the spirit and scope of the invention.

What is claimed is:

1. A dispensing system comprising:

a cabinet;

a plurality of carriers, each for carrying an article to be dispensed and having an associated target;

a support carrying the carriers in spaced relation to one another in the cabinet, each of the carriers being moveably carried on the support so that if one of the targets is struck, the associated carrier is tipped to drop an article carried therein;

a drive for rotating the support about a first axis for moving the carriers with the targets being disposed in a first select path;

an actuator movably mounted in the cabinet for movement in a second select path, the second select path intersecting the first select path in an intersecting zone;

control means for operating the actuator to move in the second select path, wherein the actuator will strike one of the targets to tip the associated carrier if the one target and the actuator are in the intersecting zone simultaneously; and a dispenser operatively associated with the cabinet for receiving an article dropped from one of the carriers for a user to collect.

2. The dispensing system of claim 1 wherein the actuator rotates about a second axis and the first axis is perpendicular to the second axis.

3. The dispensing system of claim 1 wherein the first select path is in a vertical plane and the second select path is in a horizontal plane.

4. The dispensing system of claim 1 wherein the support comprises a Ferris wheel and the carriers comprise gondolas carried on the Ferris wheel.

5. The dispensing system of claim 4 wherein each of the gondolas is carried by the Ferris wheel about a freely pivoting axis.

6. The dispensing system of claim 1 wherein the dispensing system comprises a merchandising game and the control means comprises a user operated input device for operating the actuator.

7. The dispensing system of claim 6 wherein the control means is operable to rotate the actuator a single revolution responsive to operation of the user operated device.

8. The dispensing system of claim 1 wherein the dispensing system comprises a redemption device and the targets are of plural select different sizes.

9. The dispensing system of claim 1 wherein the dispensing system is a gaming device and the control means automatically, randomly operates the actuator.

10. The dispensing system of claim 9 wherein the control means is operable to rotate the actuator a single revolution.

11. The dispensing system of claim 1 wherein the control means operates the drive and speed of the drive is selectively controlled to set skill level.

12. The dispensing system of claim 1 wherein the targets are of plural select different sizes to set skill level.

13. The dispensing system of claim 1 further comprising a hopper for storing articles to be dispensed and feed system for feeding articles to be dispensed from the hopper to the carriers.

14. The dispensing system of claim 13 wherein the feed system comprises a sensor for sensing empty carriers and a feeder selectively actuable to drop an article to be dispensed from the hopper to the carriers.

15. The dispensing system of claim 14 wherein the feed system is operable to actuate the feeder in response to the sensor finding an empty carrier.

16. The dispensing system of claim 15 wherein the feed system is operatively associated with the control means.

17. The dispensing system of claim 13 wherein the cabinet is an upright cabinet having a transparent wall frontwardly of the hopper.

18. The dispensing system of claim 14 wherein the first axis extends transversely in the cabinet so that during rotation of the support, each carrier, and an article carried therein, is visible from a front of the cabinet.

19. A dispensing system comprising:

a cabinet;

a plurality of carriers, each for carrying an article to be dispensed and having an associated target;

a support carrying the carriers in spaced relation to one another in the cabinet, each of the carriers being moveably carried on the support so that if one of the targets is struck, the associated carrier is tipped to drop an article carried therein;

a drive for moving the support in a single fixed orbit;

an actuator movably mounted in the cabinet for movement in a select path, the select path intersecting the orbit in an intersecting zone;

control means for operating the actuator to move in the select path, wherein the actuator will strike one of the targets to tip the associated carrier if the one target and the actuator are in the intersecting zone simultaneously; and a dispenser operatively associated with the cabinet for receiving an article dropped from one of the carriers for a user to collect.

20. A dispensing system comprising:

a cabinet;

a plurality of carriers, each for carrying an article to be dispensed;

a support carrying the carriers in spaced relation to one another in the cabinet, each of the carriers being moveably carried on the support so that if one of the carriers is struck, the one carrier is tipped to drop an article carried therein;

a drive for moving the support in the cabinet in a first select path;

an actuator movably mounted in the cabinet for movement in a second select path, the second select path intersecting the first select path in an intersecting zone, wherein during movement of the support each of the carriers is periodically in the intersecting zone; and control means for operating the actuator to move in the second select path, wherein the actuator will strike one of the carriers if the control means is operated so that the actuator is in the intersecting zone during a period that the one carrier is in the intersecting zone.

21. A dispensing system comprising:

an upright cabinet;

a plurality of gondolas, each for carrying an article to be dispensed and having an associated target;

first and second wheels rotatably mounted in parallel, vertical planes in the cabinet, each wheel carrying plural associated gondolas in radially spaced relation to one another, each of the gondolas being moveably carried on the associated first or second wheel so that if one of the targets is struck, the associated gondola is tipped to drop an article carried therein;

first and second drives for rotating the respective first and second wheels about a first axis for moving the gondolas with the targets being disposed in respective first and second paths;

first and second actuators movably mounted in the cabinet for movement in respective third and fourth select paths, the third select path intersecting the first select path in a first intersecting zone, and the fourth select path intersecting the second select path in a second intersecting zone;

control means for operating the actuators, wherein the actuators will strike one of the targets to tip the associated gondola if the one target and the one actuator are in one of the intersecting zones simultaneously; and dispenser operatively associated with the cabinet for receiving an article dropped from one of the gondolas for a user to collect.

22. The dispensing system of claim 21 further comprising a hopper for storing articles to be dispensed and a feed system for feeding articles to be dispensed from the hopper to the gondolas.

23. The dispensing system of claim 22 wherein the feed system comprises a sensor for sensing empty gondolas and first and second feeders associated with the respective first and second wheels selectively actuable to drop an article to be dispensed from the hopper to the gondolas.

24. The dispensing system of claim 23 wherein the feed system is operable to actuate the feeder in response to the sensor finding an empty gondola.

25. The dispensing system of claim 24 wherein the feed system is operatively associated with the control means.

26. The dispensing system of claim 22 wherein the cabinet has a transparent wall frontwardly of the hopper.

* * * * *